United States Patent [19]
England

[11] Patent Number: 5,510,604
[45] Date of Patent: Apr. 23, 1996

[54] METHOD OF READING A BARCODE REPRESENTING ENCODED DATA AND DISPOSED ON AN ARTICLE AND AN APPARATUS THEREFOR

[75] Inventor: Gary A. England, Broughton, Scotland

[73] Assignee: AT&T Global Information Solutions Company, Dayton, Ohio

[21] Appl. No.: 311,250

[22] Filed: Sep. 23, 1994

[30] Foreign Application Priority Data

Dec. 13, 1993 [GB] United Kingdom .................... 9325439

[51] Int. Cl.$^6$ .................................................... G06K 7/10
[52] U.S. Cl. .......................................... 235/462; 235/463
[58] Field of Search ...................................... 235/462, 463

[56] References Cited

U.S. PATENT DOCUMENTS

| | | | |
|---|---|---|---|
| 4,044,227 | 8/1977 | Holm et al. | 235/61.7 |
| 4,873,426 | 10/1989 | Sarna et al. | 235/462 |
| 5,216,231 | 6/1993 | Ouchi | 235/463 |
| 5,268,580 | 12/1993 | He Duanfeng | 250/566 |

FOREIGN PATENT DOCUMENTS

| | | |
|---|---|---|
| 0043124 | 1/1982 | European Pat. Off. . |
| 0353842 | 2/1990 | European Pat. Off. . |
| 0449634 | 3/1991 | European Pat. Off. . |

OTHER PUBLICATIONS

IBM Technical Disclosure Bulletin, vol. 36, No. 06A, Jun. 1993, New York, USA, pp. 241–246, XP 000372419, "Locating and Recognizing Barcodes on Scanned-in Forms".

AT&T Global Information Solutions Company (fka NCR Corporation) Patent Application Ser. No. 07/960,177, filed Oct. 9, 1992, Docket No. 4574–B.

Primary Examiner—Donald T. Hajec
Assistant Examiner—Michael G. Lee
Attorney, Agent, or Firm—Elmer Wargo

[57] ABSTRACT

In a method of, and apparatus for, reading a barcode, a barcode symbol is optically scanned into a memory (13), and a plurality of scans across the stored image are made and processed to determine the barcode. The scans are made at interleaved positions across the barcode, and are stored in a storage device (87) and tested in a testing unit (88) for a consensus of at least 2 scans, further scans being made if necessary. Preferably, more than half the scans should be in matching agreement to determine that a consensus has been reached. Each scan may be averaged from several sub-scans. The scans may be decoded into symbols. Various validity tests may be made on the scans. The scans are analysed by measuring the positions of the black-to-white and white-to-black transitions in them; the positions of the transitions may be interpolated between pixel positions.

10 Claims, 4 Drawing Sheets

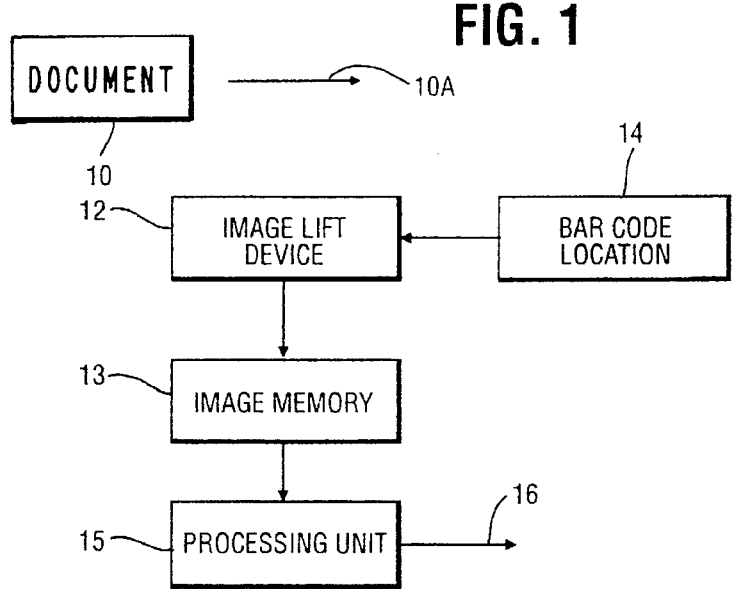
FIG. 1
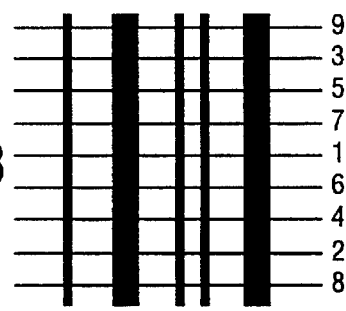
FIG. 3
FIG. 4
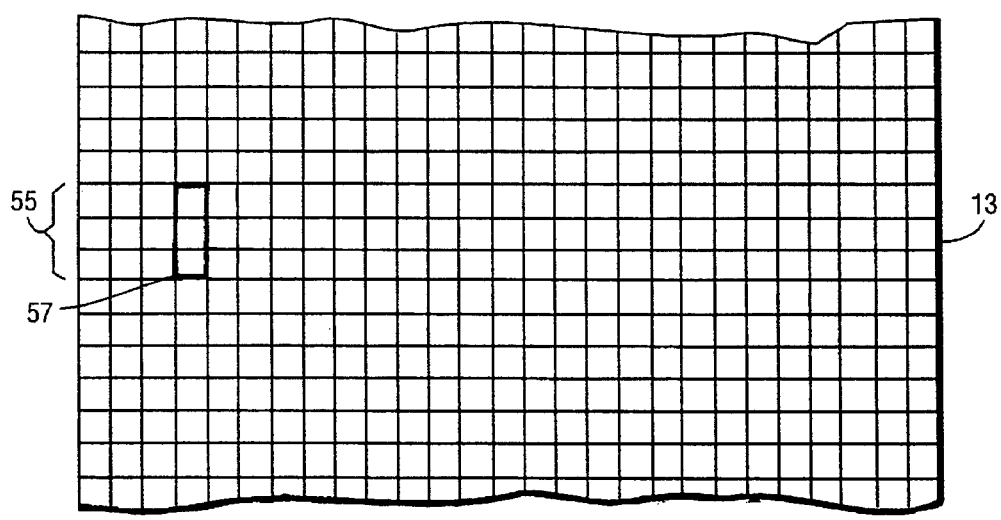
FIG. 5

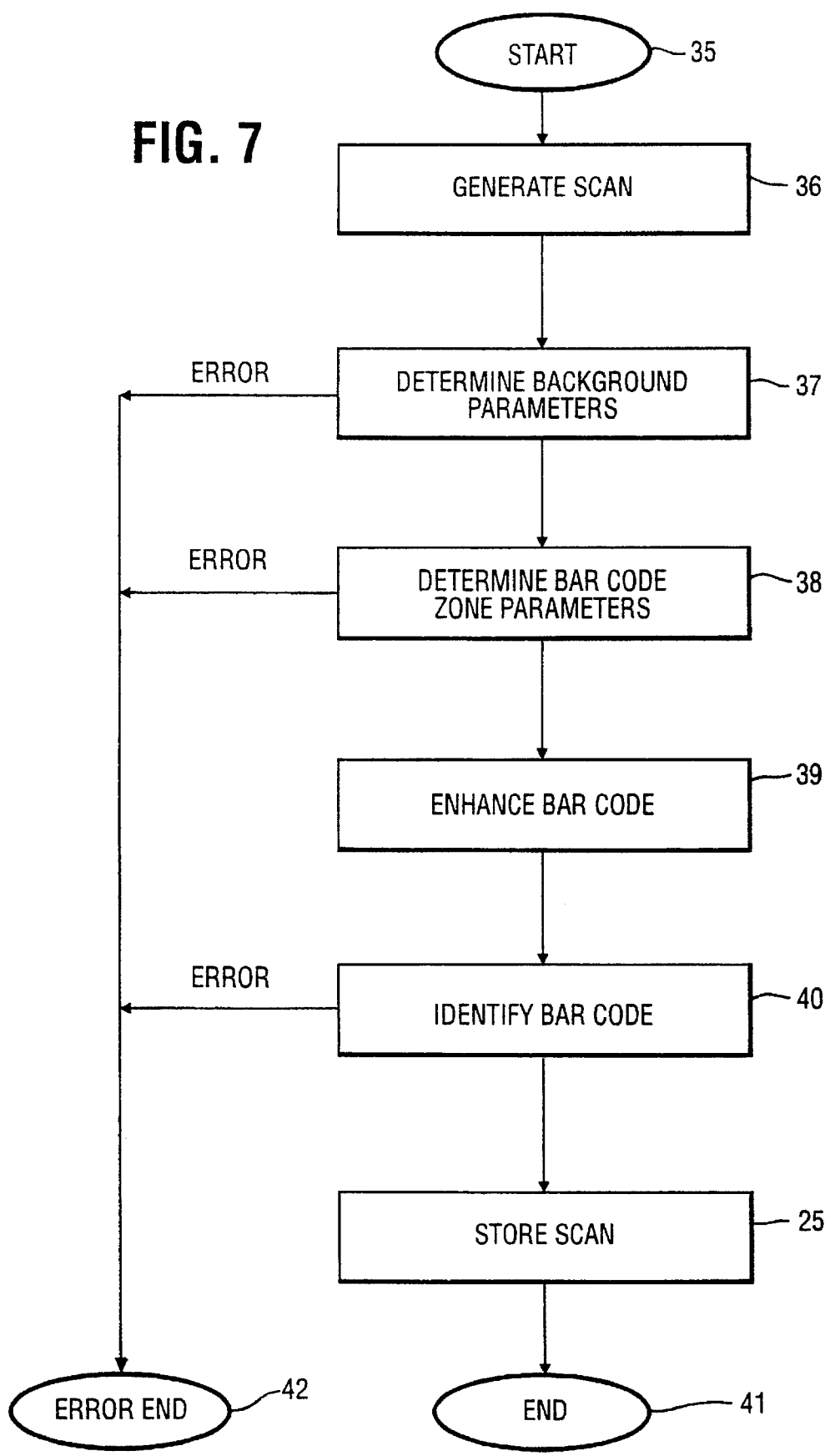

5,510,604

METHOD OF READING A BARCODE REPRESENTING ENCODED DATA AND DISPOSED ON AN ARTICLE AND AN APPARATUS THEREFOR

BACKGROUND OF THE INVENTION

The present invention relates to a method and apparatus for reading bar-codes.

Barcodes are now well established as a means by which articles (including documents) can be identified. A barcode consists of a background (conventionally white) on which there is an area or a strip consisting of a multiplicity of bars of a contrasting colour (conventionally black), each bar lying transversely across the strip. The widths of the bars and the spaces between them encode information, e.g. a code number identifying the article. The main advantage of using barcodes is that they can be identified automatically.

The output of the barcode reader may be used directly, or may be used in conjunction with other techniques for obtaining information about the article, to verify that information, to be verified by that information, or both.

There are many well established types of barcode readers. One of the simplest kinds is a "light pen" which is manually passed across the barcode (although that requires fairly elaborate clocking circuitry). Another widely used type is a laser reader as used in supermarkets, which includes a continuously scanning laser beam and photocell. When an article with a barcode is passed through the scanning zone, the photocell output is recognized as being that from a barcode.

There are many situations in which barcode readers of such types are entirely satisfactory. These situations generally have three characteristics: first, the original printing of the barcode is generally fairly well controlled, so that the barcode is "clean" and of good contrast; second, the handling of the articles carrying the barcodes is generally fairly well controlled, so that the barcodes are unlikely to become damaged; and third, an operator is normally on hand to enter the identification manually if the barcode reader fails to recognize the barcode.

However, there are many situations where these conditions may not exist. The initial printing of the barcodes may be poorly controlled (e.g. the materials on which they are to be printed may be of highly variable quality); the articles may be subject to severe handling conditions, so that the barcodes may well become dirty, scratched, or otherwise degraded; and it may be expensive or otherwise inconvenient to have an operator available to deal with unrecognizable barcodes.

For these and other reasons, barcode readers have been developed in which the barcode is optically scanned to form an electronic image which is then processed to extract the barcode from it. A barcode reader of this type is described in European Patent Application No. 0 449 634 A. The present invention is concerned with this type of barcode reader.

It may be noted that this type of barcode reader has certain additional advantages. The image can be stored and archived for auditing purposes. Also, the article carrying the barcode may also carry other information, in a form other than the barcode, which can also be extracted from the electronic image. If the article does carry other information which has been read by optical scanning and subsequent processing of an electronic image, then this type of barcode reader can obviously share the scanning mechanism, and requires only additional image processing.

In many situations, the position and orientation of the barcode on the article are both reasonably well defined and controlled. The position and orientation of the barcode in the electronic image will then be similarly defined and controlled. The present invention is concerned with barcode recognition processing means for processing an electronic image in which the barcode occupies such a reasonably well defined position in the image and has a standard orientation.

There can of course be situations in which the position and/or orientation of the barcode is not well defined or controlled, and the position and orientation of the barcode in the electronic image will then be similarly ill-defined and/or ill-controlled. In such situations, techniques are available for performing an initial analysis of the electronic image to locate the barcode and its orientation and to rotate the image (including the barcode) and to shift it, if necessary, so that the barcode occupies a reasonably well defined position in the image and has a standard orientation, i.e. is suitable for the present invention to be used on it. A virtual image rotation can of course be used, by applying a suitable transformation to obtain actual image coordinates from the coordinates used by the barcode recognition processing means.

It is assumed for convenience that the barcode (in the electronic image) occupies a horizontal band, i.e. the bars are vertical. The image will consist of an array of pixels each having a value which corresponds to the brightness or reflectivity of the corresponding point or element of the barcode on the article. The pixel values are measured on a grey scale; we shall assume that pure black (zero reflectance) has a value 0 and pure white (total reflectance) has a value 1, with intermediate shades of grey having values between 0 and 1.

It is also assumed that the barcode is of a type in which the bars extend across the whole width of the band containing the barcode so that the information carried by the barcode is contained exclusively in the widths of the bars and/or their spacing.

The ideal image will consist of a set of geometrically precise bar-shaped areas in which all pixel values are 0 in a field of background pixels with value 1. In practice, however, the "white" pixel values will be somewhat less than 1, the "black" pixel values will be somewhat more than 0, the boundaries around the bands will be fuzzy, and the original barcode and hence also the image may be further degraded in other ways. The barcode reader therefore has to extract, from this degraded image, an accurate representation of the barcode, i.e. it has to extract the information which the barcode represents.

The above-named European Patent Application No. 0 449 634 A proposes various possible ways of achieving this. One way involves simple averaging of the values at corresponding positions in a number of parallel scans across the barcode; a second involves taking the median of those values rather than their average; and a third way involves correlating the various scans and weighting the scans so that those which correlate well with others are given higher weights than those which correlate badly with others.

SUMMARY OF THE INVENTION

It is the object of the present invention to provide a method and apparatus for reading a barcode wherein there is only a low probability of mis-reads, that is, incorrect interpretation of the barcode symbol.

Therefore, according to one aspect of the present invention, there is provided a method for reading a barcode representing encoded data and disposed on an article, including the steps of optically scanning said barcode and storing an image thereof in a memory, characterized by the steps of performing a plurality of scans across the stored image; storing the resulting scans in storage means; testing the stored scans for consensus of at least two scans; and evaluating the encoded data in dependence on a consensus being reached.

According to another aspect of the present invention, there is provided barcode reading apparatus, including means for optically scanning a barcode on an article and memory means for storing an image of the scanned barcode, characterized by: processing means adapted to perform a plurality of scans across the image stored in said memory means; storage means adapted to store the resulting scans; and testing means adapted to test the stored scans for a consensus of at least two scans.

It will be appreciated that in a method and apparatus according to the present invention the probability of mis-reads is reduced by utilizing a consensus of two more scans to evaluate the barcode symbol.

One embodiment of the present invention will now be described by way of example, with reference to the following specification, claims, and accompanying drawing.

BRIEF DESCRIPTION OF THE DRAWING

FIG. 1 is a block diagram of a barcode article handling unit.

FIG. 3 illustrates how the scans across the barcode image are organized.

FIG. 4 is a block diagram of a portion of the barcode recognition processing means.

FIG. 5 is a diagram of a portion of the image memory shown in FIG. 1.

FIG. 7 is a more detailed flow diagram for part of FIG. 2.

DESCRIPTION OF A PREFERRED EMBODIMENT

Figure 2:
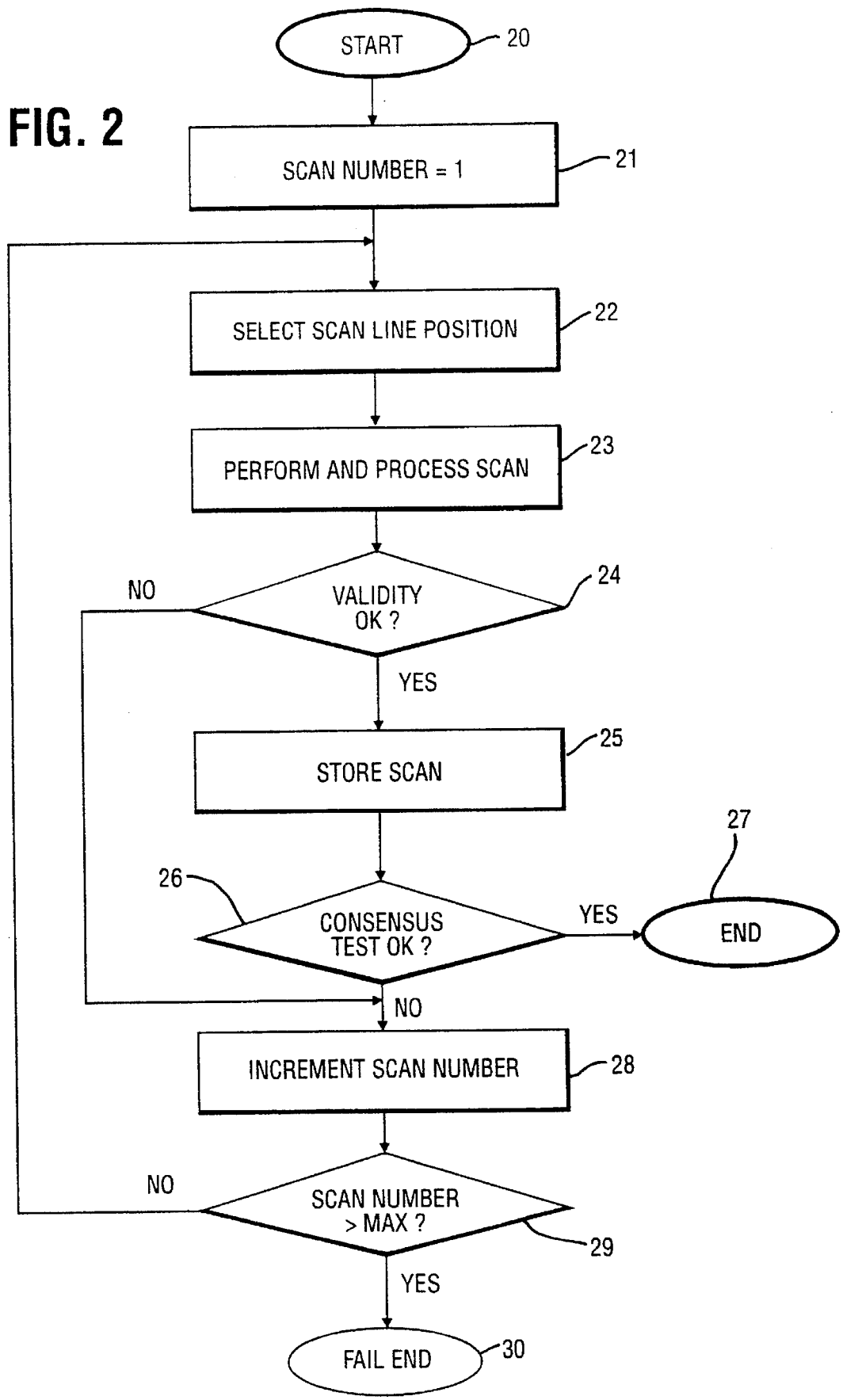
FIG. 2 is a general flow diagram for the system.

Referring to FIG. 1, a document 10 carrying a barcode (not shown) is carried by document transport means (not shown) in the direction of the arrow 10A past an image lift (scanning) device 12, which may for example be a video camera. The output of the device 12 is fed to an image memory 13, in which an electronic image of the document is thus built up. A barcode location unit 14 may be coupled to the device 12 to identify the position on the document 10 which carried the barcode and to direct the image lift device 12 to that position. A processing unit 15 is coupled to the memory 13 for processing the image in the memory, recognizing the barcode therefrom and providing an output on a line 16.

FIG. 2 is a general flow diagram for the system. In broad terms, the system generates a series of scans across the barcode image in an interleaved pattern, and when the number of scans is sufficient, the system compares them to determine whether a consensus can be achieved. If there is no consensus, the sequence is continued. It will of course be realized that the details of the operation of the system, including the details of this flow diagram, can be changed in various ways.

FIG. 3 shows a convenient pattern for the sequence of scans. It is assumed that the location of the barcode, i.e. the boundaries to the strip which the barcode occupies in the image in memory 13, has been determined by e.g. the barcode location unit 14 or some other image preprocessing, so that the scans can be made at the desired positions across the barcode. As shown in FIG. 3, nine scans are made, forming a parallel set of scans equally spaced across the width of the strip containing the barcode. The scans are made in the order shown, at the right of FIG. 3, from scan no. 1 to scan no. 9.

The testing for consensus starts when two scans have been made. The first two scans are located at roughly ½ and ¼ way across the width of the barcode; spaced well apart from each other (so that small defects in the barcode will only affect one of the scans) but not too close to the edges of the barcode (as the edges may be damaged). If there is no consensus between these first 2 scans, then a third scan is made, at roughly ¾ way across the barcode. If there is still no consensus, further scans are made, in the sequence shown, with a new testing after each scan, until a consensus is reached. It will be noted that the order in which the scans are made is that the centre line of the image is read first and that consecutive scans do not scan adjacent strips. If no consensus is reached when the full number of scans has been made, then the barcode is declared unreadable.

A consensus is preferably defined as a "majority vote", that is, more than half the scans being in agreement with each other (with at least two scans having been made). Alternatively, the required agreement level can be set at a higher level (e.g. a two-thirds majority). The agreement can be tested either on the direct scan information as to the positions and width of the bars of the barcode, or preferably, on the decoded barcode, i.e. the symbol sequence obtained by decoding the information about the bar widths and positions. If the direct scan information is used for testing agreement, then obviously a suitable tolerance must be defined for determining whether or not an acceptable match exists. Thus, the required agreement may be global, i.e. the match must be of the entire scans; or it may be local, so that if say scans 1 and 2 match over the first ⅔rds of the barcode length and scans 1 and 3 match over the last ⅔rds of the barcode length, a consensus exists). For a local agreement test, obviously the test must be on the direct scan information; for a global agreement test, the test can be on either the direct scan information or the decoded symbol sequences.

If a consensus cannot be reached, optionally any scan which is in extreme disagreement with most or all of the other scans can be rejected, and the remaining scans tested for a consensus. The consensus procedure reduces the probability of mis-reads of the barcode.

Returning to FIG. 2, the operation starts at block 20, and a scan number is set to 1 in block 21. This scan number is held in a scan number counter 45 (FIG. 4). In block 22, the scan position (in a scan position register 46) for the scan number is determined, by using a look-up table 47 which implements the FIG. 3 relationship between scan number and scan position. The image is then scanned and the resulting scan is processed in various ways in block 23. A validity check is then made on the scan, in block 24. Assuming that the scan is not invalid, the scan is then stored at block 25. A test is then made by a consensus testing unit (to be discussed) for consensus among all the stored scans, in block 26. If a consensus is found, then the barcode is taken as having been successfully read, and the process terminates, at block 27. If there is no consensus, then the scan number is incremented in block 28, and the system returns via block 29 to block 22 to make another scan.

In block 29, the scan number is tested after being incremented in block 28. If the scan number is greater than the maximum number of scans (nine in the system shown in FIG. 3), the maximum number of scans has already been made, and the process terminates at block 30 with a failure to read the barcode. If the validity check on a scan fails in block 24, that scan is discarded. The system skips over blocks 25 and 26, so that the scan is not recorded or used in the consensus testing, and the system proceeds direct to block 28, to initiate the next scan.

Block 25 stores the valid scans for use in the consensus testing of block 26, and also stores the number of valid (stored) scans; this number will be less than the scan number of blocks 21, 22 and 29 if any of the scans are invalid. The scans are stored in the form required to perform the consensus test; thus if the consensus test is performed on the decoded scans, the scans will be stored as the decoded symbols. Block 26 only performs the consensus test if the number of valid scans stored in block 25 is at least two.

FIG. 7 shows the operations of blocks 23 to 25 in more detail; it will be realized that instead of the validity testing being performed after all the procedures of block 23 have been completed, as shown in the simplified diagram of FIG. 2, it preferably occurs during those various procedures. The procedures are entered at the start block 35 from block 21 or 29, and are left at the end block 41 (going on to block 26), or at the error (invalid scan) end block 42 if a validity test fails (going on to block 28).

The first operation is to generate the scan, block 36, and the result of this block is an image scan i.e. a row of image elements stretching across the image of the barcode. In a simple form of the system, these image elements are a row of pixels in the memory 13; however, these image elements are preferably obtained from the raw pixels by suitable processing of a plurality of sub-scans. This reduces scanning process noise and the effects of imperfections in the printed barcode.

Figure 6:
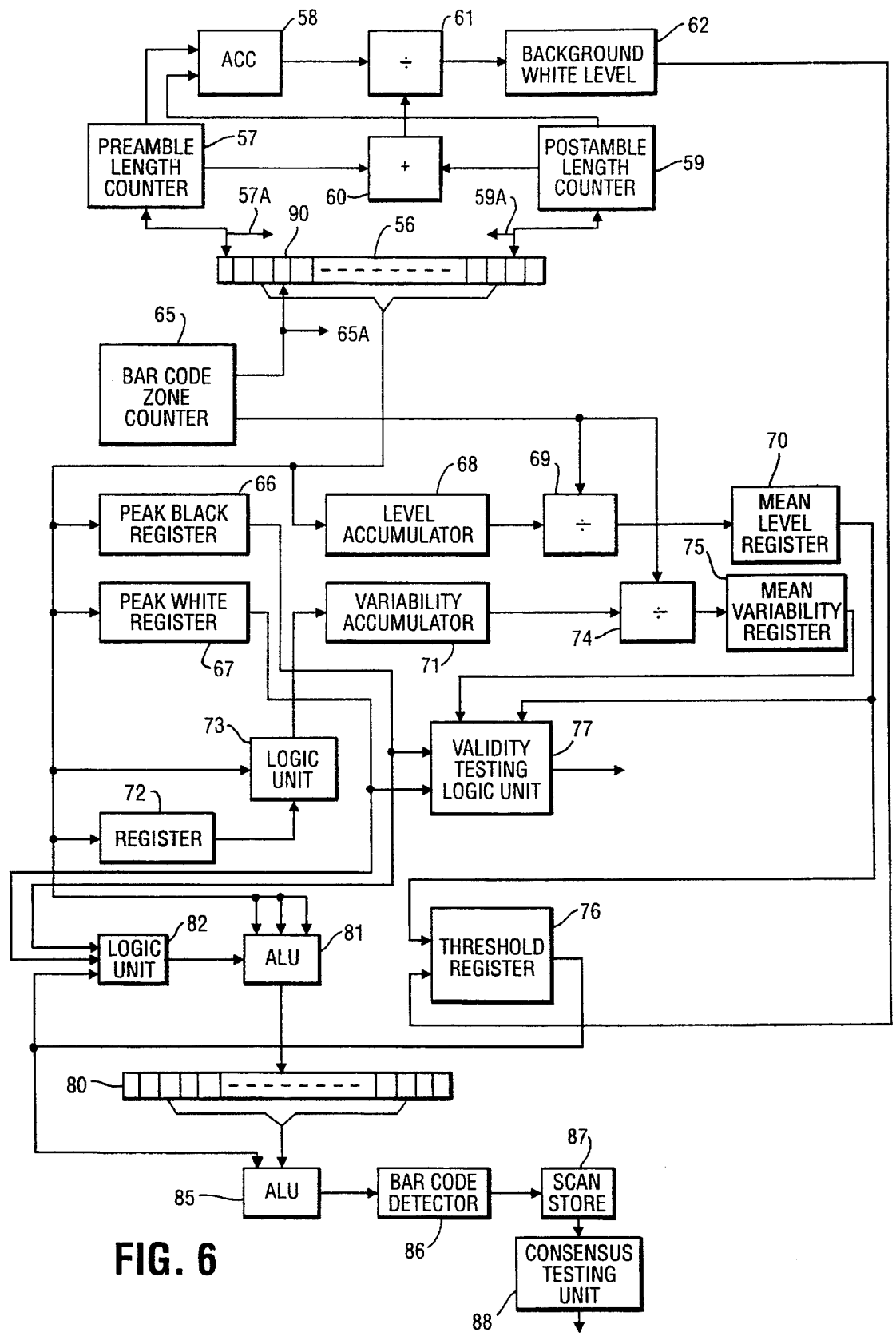
FIG. 6 is a block diagram of a further portion of the barcode recognition processing means.

For this a plurality of adjacent lines of pixels are averaged together to generate a single resultant line. FIG. 5 shows a section across the memory 13. We assume that the scan is to be generated from three sub-scans, although this is not a limitation, and a different number of sub-scans may be used. This involves averaging three lines of pixels 55. A (first) scan register 56 (FIG. 6) consists of a single line of storage cells of the same width as the memory 13. To generate the scan in the scan register 56, vertical triplets of pixels in the lines 55 have their contents added together and divided by 3 to generate the values entered into the scan register 56; thus to generate the contents of cell 90 in the scan register 56, for example, the contents of the pixel triplet 57 are added together and divided by 3.

To avoid losing information, there are preferably no gaps between the sets of sub-scans for the different scans. A minor degree of overlap between the sub-scans of the different scans is acceptable, e.g. to enable the number of sub-scans per scan to be the same for all scans.

The next operation (block 37), once the scan has been generated, is to determine the characteristics of the background around the barcode. The scan length is greater than the length of the barcode, so that scan register 56 will contain the barcode (or, more precisely, a strip through it) preceded by a blank background preamble zone and followed by a blank background postamble zone.

A preamble length counter 57, initially set to 0, is used to step along the scan register 56 in the direction of the arrow 57A. As each cell is reached, its contents are tested to determine whether they represent white or black. Taking pure black as 0, the test is simply whether the value in the cell is greater than 0.5 (half the pure white value of 1). If it is, that value is added into an accumulator 58, and counter 57 is incremented to select the next cell along in the scan register. When a cell is reached with a value in it less than 0.5, incrementing of the counter 57 is stopped. A similar postamble length counter 59 is used to step along the scan register 56 backwards in the direction of the arrow 59A from the other end, with the values from the postamble cells being similarly accumulated into the same accumulator 58.

When the lengths of the preamble and postamble zones have both been found, the two lengths are added together in an adder 60 and the contents of the accumulator 58 are divided by this sum in divider 61 to generate, in register 62, an average white level for the background zones around the outside of the barcode.

If the length of either the preamble or the postamble is zero, the scan is regarded as invalid and block 37 (FIG. 5) is left via an error output to the error (invalid) end block 42.

From the block 37, the next operation is block 38, in which the characteristics of the barcode itself are determined. A barcode zone counter 65 is used to count along the barcode zone in the direction of the arrow 65A, i.e. the zone of the scan register 56 which starts at the end of the preamble and ends at the start of the postamble.

A pair of registers 66 and 67 is used to determine the peak actual black and white levels in the barcode. The registers are both initialized to 0.5 (half the pure white level); then, as the counter 65 steps along the barcode in the scan register 56, in the direction of the arrow 65A, the value in each cell in turn is compared with the values in the two registers 66 and 67. If the cell value is less than the value in register 66, the value in register 66 is reduced to the cell value; if the cell value is greater than the value in register 67, the value in register 67 is increased to the cell value.

A barcode cumulative level accumulator 68 is used to accumulate the values of all cells in the barcode zone of the scan register 56; these values are fed to this accumulator as the counter 65 steps along. The final sum is divided by the length of the barcode zone (i.e. the length of the scan register 56 less the lengths of the preamble and postamble) in a divider 69 to generate a barcode mean level in a register 70.

Also, a variability accumulator 71 is used to accumulate the total variability of the barcode. For each step of the counter 65, the value of the cell in the scan register 56 is temporarily stored in a register 72, and for each step of the counter 65 except the first, the value of the current cell in the scan register 56 is compared with the value of the previous cell (from register 72) by a logic circuit 73 which produces the absolute (unsigned) value of the difference, which is passed to the accumulator 71. The final sum in the accumulator 71 is divided by the length of the barcode (decreased by 1) in a divider 74 to generate a barcode mean variability in a register 75.

This mean variability is the sum of various components or characteristics of the barcode (or more precisely, of the scan representing the barcode) that is to say the contrast; the number of black bars (or more precisely the number of both leading and trailing black bar edges); and its noisiness. If, as is often the case, the contrast is high and the number of black bars is constant (with the information in the barcode being carried solely by the widths of the bars and their spacing), the variability can be taken simply as a measure of the noisiness of the barcode. More sophisticated measures of the noisiness of the barcode can be used if desired.

When the background level has been set in register 62 and the barcode mean level has been set in register 70, a threshold register 76 has its value set to half the background level or to the barcode average, whichever is the smaller.

Once these various characteristics of the barcode itself have been determined, some more validity tests are carried out by a comparator logic unit 77. The conditions for validity are:
1. The value range in the barcode (i.e. the difference between the contents
   of the registers 66 and 67) should be at least a predetermined fraction
   (e.g. 30%) of the peak actual white level (in register 67).
2. The average value in the barcode (in register 70) should differ from both
   limits of the value range of the barcode (in registers 66 and 67) by at least
   a predetermined fraction of the peak actual white level (e.g. 10%).
3. The variability (in register 75) should be at least a predetermined fraction of the peak actual white level (e.g. 3%).

If any of these conditions is not met, then the scan is regarded as invalid and block 38 (FIG. 5) is left via an error output to the invalid end block 42.

From block 38, the next operation is block 39, in which the barcode in the scan is enhanced. It will be appreciated that enhancement reduces the probability of non-reads of the barcode, that is, inability to decode the barcode.

The enhanced barcode scan is generated in a second barcode register 80, by means of an arithmetic unit 81. A counter (which may be counter 65) is used to step along the barcode zone in this second scan register 80 and also along the barcode in the first scan register 56, but each step of the stepping along the first scan register extracts the value of three successive cells. Unit 81 subtracts half the sum of the values of the two outer cells of the triplet from the value of the centre cell of the triplet, multiplies this by a multiplier parameter k, and adds the product to the value of the centre cell; this value is entered into the corresponding cell in the second barcode register 80.

The equation for this is $$v_n^1 = v_n + k\{v_n - (v_{n-1} + v_{n+1})/2\}$$

with self-evident symbolism. The second term in the curly brackets is the mean of the values of the two outer cells of the triplet, and the complete curly brackets term represents the extent to which the value in the centre cell deviates from linearity. The addition of the curly brackets term (multiplied by the multiplier k) to the value of the middle cell increases this deviation. Thus the "peakiness" of the enhanced scan is increased over that of the original scan, i.e. the high (spatial) frequency components of the original scan are enhanced. This, in combination with the "vertical" averaging of the sub-scans, implements a 2-dimensional digital filtering which accentuates (sharpens up) the edges of the barcode.

Of course, the values of the cells in the second scan register 80 are limited to lie in the range 0 to 1. Also, the contents of the first and last cells in the barcode zone are simply copied directly from the first to the second scan register, as they cannot form part of a triplet.

The parameter k which controls the extent of this enhancement is determined by a logic unit 82. This logic unit calculates the function (d-var)/var, where d is the larger of the differences between the threshold value in register 76 and the actual peak black and white values in registers 66 and 67, and var is the variability in register 75. The result is limited to the range 0 to 1, and taken as k.

From block 39, the next operation is block 40, in which the barcode in the scan is determined. More precisely, the edges of the bars, i.e. the positions of the transitions between black and white in the scan, are determined.

For this, a counter (not shown, but which may be counter 65) is used to step along the barcode zone in the second scan register 80, with each step of the stepping along this scan register extracting the values of a pair of successive cells. An arithmetic unit 85 compares the values of the two cells of each pair with the threshold value in register 76. If the value in the first cell of the pair is above the threshold and the value in the second is below the threshold, the count of the counter is recorded as a white-to-black transition, i.e. as the start of a black bar; if the value in the first cell of the pair is below the threshold and the value in the second is above the threshold, the count of the counter is recorded as a white-to-black transition, i.e. as the start of the black bar.

Preferably the arithmetic unit also calculates an interpolation to give more precise positions. For this, the quantity $(v_{th}-v_1)/(v_2-v_1)$ is calculated (where $v_1$, $v_2$ and $v_{th}$ are the values of the first and second cells of the pair of cells and the threshold value) and added to the count from the counter 65. This is not necessary if the width of the smallest bar and gap is much larger than the pixel size.

It may be convenient to extend the barcode zone by including one cell from the preamble and one cell from the postamble, so that the first white-to-black transition of the barcode and its last black-to-white transition can also be located more precisely. The additional cells are, of course, preferably also included in the barcode enhancement. Indeed, the entire contents of the first scan register can be retained and enhanced in the second register if desired; this will result in some extra unnecessary processing, but should not otherwise affect the operation of the system.

The resulting counts, i.e. position values, are stored in block 25. This may be done by passing the counts directly to a scan store 87. Preferably, however, they are passed to a barcode decoder 86 which decodes the barcode and then passes the decoded barcode symbols to the scan store 87. If it is not possible to decode the barcode, then the scan is invalid and block 40 (FIG. 5) is left via an error output to the invalid end block 42.

Some a priori knowledge of the permissible barcode symbol combinations (i.e. the decoded barcode) may be available; e.g. it may be known that certain symbols are not permissible, or that the symbol combinations must lie within a predetermined range. If this is so, then the decoded barcode can be tested for validity and, if invalid, the scan is regarded as invalid and block 40 (FIG. 5) is again left via an error output to the invalid end block 42. Otherwise, when the barcode has been completely identified and decoded and the decoded barcode has been stored in scan store 87, the process proceeds to end block 41.

At this point, the sequence of FIG. 7 has been completed, i.e. blocks 23 to 25 of FIG. 2 have been completed, and the process continues with block 26 of FIG. 2, as described above. In particular, the FIG. 2 process continues with block 26, in which the scans stored in the scan store 87 are tested by a consensus testing unit 88, FIG. 6, in the manner described hereinabove.

What is claimed is:

1. A method of reading a barcode representing encoded data and disposed on an article, the method comprising the steps of:

(a) optically scanning the barcode and storing an image thereof in memory;

(b) performing a plurality of scans at interleaved positions across the stored image of the barcode;

(c) storing each scan from step (b) in a storage unit;

(d) testing two stored scans from step (c) for a consensus;

(e) repeating step (d) until either (i) a consensus of two stored scans is reached which is indicative of a readable barcode or (ii) a predetermined number of stored scans of the barcode is tested which is indicative of an unreadable bar code; and (f) evaluating the encoded data of the barcode only when a consensus of two stored scans is reached in step (e).

2. A method according to claim 1, wherein step (b) includes the step of:

(b-1) performing a plurality of sub scans and averaging their results.

3. A method according to claim 1, wherein step (b) includes the step of:

(b-1) subjecting the scans to contrast enhancement.

4. A method according to claim 1, wherein step (d) includes the step of:

(d-1) testing for consensus among a majority of the scans being tested.

5. A method of reading a barcode representing encoded data and disposed on an article, the method comprising the steps of:

(a) optically scanning the barcode and storing an image thereof in memory;

(b) performing first and second scans across the stored image of the barcode;

(c) storing each scan from step (b) in a storage unit;

(d) performing another scan across the stored image of the barcode such that all scans performed including the first and second scans are at interleaved positions across the stored image of the barcode;

(e) storing the scan from step (d) in the storage unit;

(f) testing two stored scans for a consensus; and (g) repeating steps (d), (e), and (f) until either (i) a consensus of two stored scans is reached which is indicative of a readable barcode or (ii) a predetermined number of stored scans of the barcode is tested which is indicative of an unreadable bar code.

6. A method according to claim 5, further comprising the step of:

(h) evaluating the encoded data of the barcode only when a consensus of two stored scans is reached in step (g).

7. A method according to claim 5, wherein step (b) includes the step of:

(b-1) subjecting the first and second scans to contrast enhancement.

8. A method according to claim 5, wherein step (f) includes the step of:

(d-1) testing for consensus among a majority of the scans being tested.

9. An apparatus for reading a barcode representing encoded data and disposed on an article, the apparatus comprising:

a memory unit;

a scanning unit for optically scanning the barcode and storing an image thereof in the memory unit;

a storage unit; and a processing unit including circuitry for (i) performing a plurality of scans at interleaved positions across the image of the barcode stored in the memory unit and (ii) storing the resulting scans in the storage unit;

the processing unit including a testing unit for testing two stored scans in the storage unit until either (i) a consensus of two stored scans is reached which is indicative of a readable barcode or (ii) a predetermined number of stored scans of the barcode is tested which is indicative of an unreadable bar code.

10. An apparatus according to claim 9, wherein the testing unit determines a consensus as being reached if a majority of the scans being tested are in matching agreement.

* * * * *